United States Patent

Tanaka et al.

Patent Number: 5,346,668
Date of Patent: Sep. 13, 1994

[54] COPPER BASED ALLOY FOR WEAR RESISTANT SLIDING LAYER AND SLIDING MEMBER

[75] Inventors: Tadashi Tanaka, Konan; Masaaki Sakamoto, Nagoya; Koichi Yamamoto, Komaki; Kenji Sakai, Ichinomiya, all of Japan

[73] Assignee: Daido Metal Company Ltd., Nagoya, Japan

[21] Appl. No.: 40,028

[22] Filed: Mar. 30, 1993

[30] Foreign Application Priority Data

Mar. 31, 1992 [JP] Japan ................. 4-077342

[51] Int. Cl.$^5$ .......... C22C 30/00; C22C 9/00
[52] U.S. Cl. .................. 420/485; 420/473; 420/474; 420/475; 420/479
[58] Field of Search .......... 430/485, 473, 474, 475, 430/479

[56] References Cited

U.S. PATENT DOCUMENTS

| | | | |
|---|---|---|---|
| 4,206,268 | 6/1980 | Roemer et al. | 420/474 |
| 4,505,987 | 3/1985 | Yamada et al. | 420/473 |
| 4,632,806 | 12/1986 | Morikawa et al. | 420/473 |
| 5,183,637 | 2/1993 | Tanaka et al. | 420/479 |
| 5,246,509 | 9/1993 | Kato et al. | 420/479 |

FOREIGN PATENT DOCUMENTS

| | | | |
|---|---|---|---|
| 0054240 | 3/1982 | Japan | 420/479 |
| 536980 | 6/1941 | United Kingdom | . |

*Primary Examiner*—Upendra Roy
*Attorney, Agent, or Firm*—Browdy and Neimark

[57] ABSTRACT

A Cu-based wear-resistant alloy of a sliding material consists essentially of, by weight, 10–35% Zn, 2–20% Pb, 1–10% Ni, 0.1–1% B and, as required, 0.5–10% of Sn. The alloy can be used under severe conditions of use at elevated speed and temperature with reduced risk of seizure and corrosion. The alloy can be produced by mixing Pb powder and Ni—B alloy powder with Cu—Zn powder or Cu—Zn—Sn alloy powder, or mixing Ni—B alloy powder with Cu—Zn—Pb alloy powder or Cu—Zn—Sn—Pb alloy powder. The alloy can be compacted and sintered to form a sliding member or a composite sliding member is obtained by sintering and integrating the alloy on a steel backing plate optionally having a surface plated with copper.

8 Claims, 2 Drawing Sheets

COPPER BASED ALLOY FOR WEAR RESISTANT SLIDING LAYER AND SLIDING MEMBER

BACKGROUND OF THE INVENTION

1. Field of the Invention

The present invention relates to a wear resistant alloy for use as a material of a sliding member and also to a sliding member made of such an alloy, as well as a method of producing such a sliding member. More particularly, the present invention is concerned with a wear resistant alloy suitable for use as the material of various sliding parts or members which are used under severe sliding conditions in automobiles, ships, aircrafts and usual industrial machines, such as bushes and washers used in floating bearings of turbochargers and thrust bearings, and also to such sliding part or member, as well as a method of producing such sliding part or member.

2. Description of the Related Art

Hitherto, alloys of lead bronze alloy system (JIS H5115) or free cutting brass alloy system (JIS H3250) have been used as materials of bushes and washers of the type described above.

In recent years, sliding parts or members of the kind described must endure severer conditions of use due to, for example, increase in the speed and operating temperature of engines. As a result, alloys of a lead bronze alloy system are required to have greater resistance to decayed oils, while alloys of a free cutting brass alloy system cannot well meet the demands for resistance both to seizure and wear.

In particular, a floating bearing of a turbocharger and a thrust bearing mounted on an internal combustion engine are required to operate at higher temperatures due to increase in the rate of heat transmission from the turbine.

When an alloy of a lead bronze alloy system is used as a material of such a bearing, sulfur content of the lubricant oil reacts with copper in the bearing alloy so as to form copper sulfide. This leads to growth of a blackening layer composed mainly of copper sulfide on the bearing surface, resulting in wear and exfoliation of the surface layer of the bearing during the operation.

The alloy of free cutting brass alloy system is free from the problem of growth of blackening layer but tends to cause seizure during operation under a boundary lubricating condition, partly because of small content of lead which exhibits self-lubricative properties.

SUMMARY OF THE INVENTION

An object of the present invention resides in providing an alloy which is suitable for use as a material of a sliding member and exhibits excellent resistance to seizure, wear and corrosion even when used under severe conditions such as elevated operation speed and temperature as typically experienced in turbochargers.

According to the present invention, there is provided an alloy which has a matrix which is formed of a Cu—Zn alloy excellent in resistance to blackening corrosion. In this matrix, dispersed is lead which has excellent self-lubricative properties. The lead content of the alloy is much greater than the lead content in usual free cutting brass alloys. The alloy further contains Ni—B compound which is excellent in wear resistance.

More specifically, according to one aspect of the present invention, there is provided a wear-resistant alloy for use as a material of a sliding member, consisting essentially of 10 to 35 wt % of Zinc, 2 to 20 wt % of lead, 1 to 10 wt % of nickel, 0.1 to 1 wt % of boron, and balance of copper and unavoidable impurities. The alloy may be strengthened by further comprising 0.5 to 10 wt % of tin.

According to another aspect of the present invention, there is provided a wear-resistant sliding member having a laminate structure including a backing metal layer of a steel plate optionally having a surface plated with copper, and a sliding layer made of the above-mentioned alloy.

According to still another aspect of the present invention, there is provided a method of producing a wear-resistant sliding member formed of the above-mentioned alloy, comprising the steps of mixing lead powder and Ni—B alloy powder together with Cu—Zn alloy powder or Cu—Zn—Sn alloy powder, compacting the powder mixture into a member having a predetermined shape, and sintering the compacted member. Alternatively, the sliding member can be produced by a similar method as above, by mixing Ni—B alloy powder together with Cu—Zn—Pb alloy powder or Cu—Zn—Sn—Pb alloy powder.

In a specific form of the production method, a composite sliding member is formed by mixing lead powder and Ni—B alloy powder together with Cu—Zn alloy powder or Cu—Zn—Sn alloy powder, placing the powder mixture in a layer on the surface of a steel backing optionally having a surface plated with copper, heating the layer together with the steel backing to sinter the layer thereby integrating the layer with the steel backing, and rolling the sintered layer integrated with the steel backing. Alternatively, this composite sliding member can be produced by the same process as above, by mixing Ni—B alloy power together with Cu—Zn—Pb alloy powder or Cu—Zn—Sn—Pb alloy powder.

DETAILED DESCRIPTION OF THE INVENTION

Figure 1:
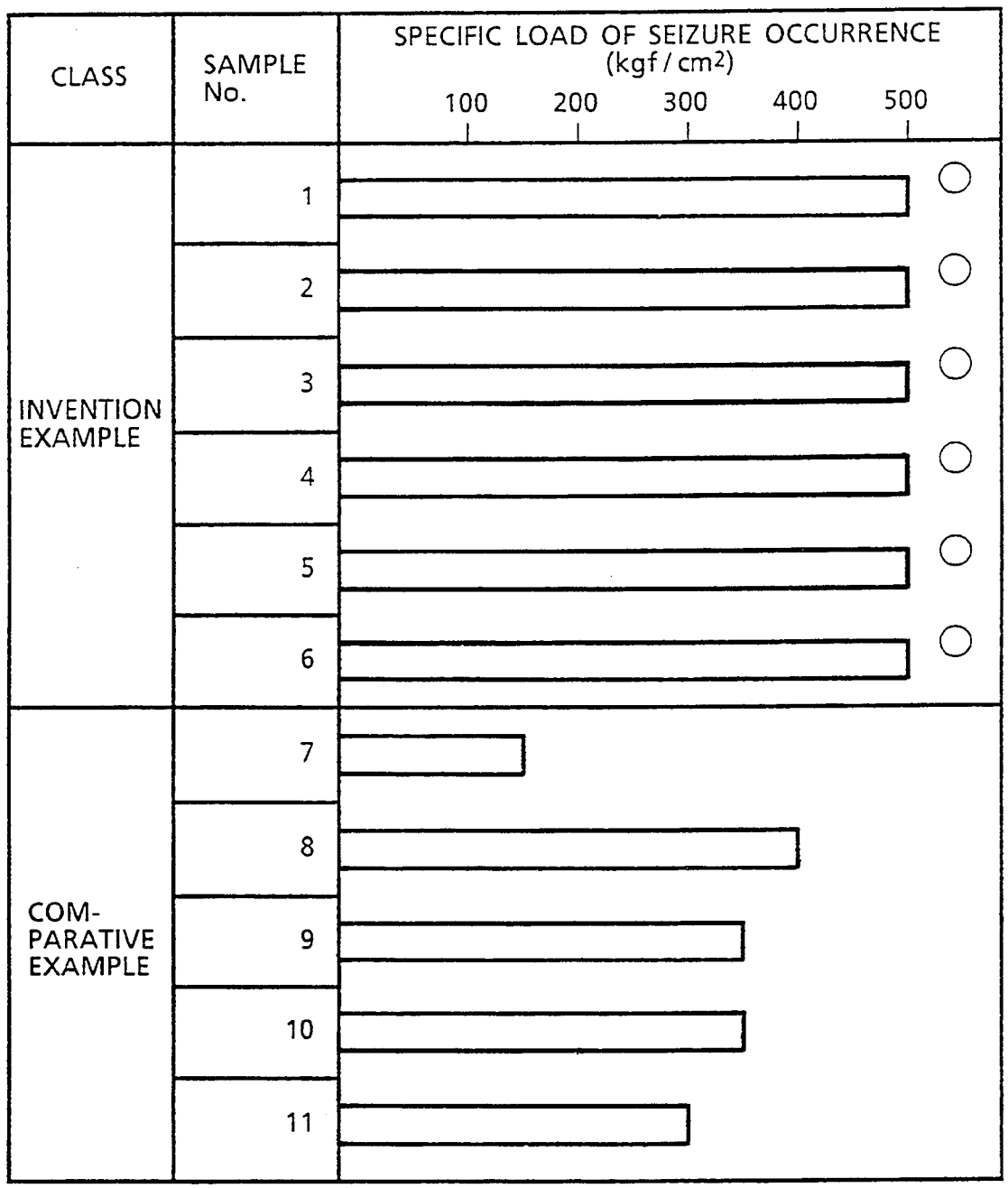
FIG. 1 is a graph illustrative of the results of a seizure test wherein the mark ◯ indicates that no seizure has occurred up to load level of 500 kgf/cm$^2$.

The wear-resistant alloy is preferred for the following reasons.

1) Zn: from 10 to 35 wt %

Zinc and copper form a solid solution to strengthen the matrix, thus improving wear resistance of the alloy. Zinc also improves corrosion resistance against decayed oil. These effects, however, are not noticeable when the zinc content is below 10 wt %. Zinc content exceeding 35 wt % causes the alloy brittle and increases tendency of segregation of lead.

2) Pb: from 2 to 20 wt %

Lead is a softening component and exhibits self-lubricative properties, as well as good affinity of the alloy for oil, thus exhibiting seizure resistance properties. These effect, however, cannot be fully attained when the lead content is below 2 wt %. Lead content exceeding 20 wt % causes a reduction in the strength of the alloy and hampers uniform distribution of lead throughout the alloy structure.

3) Ni: from 1 to 10 wt %

Most of nickel component in the alloy forms a compound by reacting with boron. Ni—B compound exhibits a Vicker's hardness (Hr) not smaller than 1000, and is dispersed in the alloy to improve wear resistance. This effect is not appreciable when the Ni content is below 1 wt %. Ni content exceeding 10 wt % causes embrittlement of the alloy and accelerates the wear of the mating alloy member.

4) B: from 0.1 to 1 wt %

Boron is an element which reacts with Ni to form an Ni—B compound so as to improve wear resistance, as stated before. The content of boron is therefore determined in relation to the content of nickel. Effective Ni—B compound is formed when the weight ratio of boron content to the nickel content is about 0.1:1 (B/Ni=0.1/1). Thus, in view of the above-mentioned preferred range of the nickel content, the effect of improvement in the wear resistance is insufficient when boron content is below 0.1 wt %. Increase in boron content in excess of 1 wt % merely causes increase in free boron content and does not cause further improvement in wear resistance properties of the alloy.

5) Sn: from 0.5 to 10 wt %

Tin, together with Zinc, reacts with copper to form a solid solution, so as to strengthen the matrix, thus contributing to improvement in wear resistance of the alloy. This effect is not appreciable when tin content is below 0.5 wt %. Addition of tin in excess of 10 wt % causes generation of $\delta$-phase in addition to $\alpha$-phase, resulting in embrittlement of the alloy, as well as non-uniform distribution of lead.

EXAMPLE 1

Powder mixtures were prepared to have compositions as shown in Table 1, by mixing Cu—Zn alloy powder or Cu—Zn—Sn alloy powder with lead powder and Ni—B powder. Each type powder was pressed in a die under a pressure of 4 tons/cm$^2$ into a columnar cylindrical green compact of 30 mm in outside diameter. Subsequently, the green compact member was sintered in a hydrogen atmosphere at 800° C. to 900° C. of temperature for thirty minutes, and the thus sintered member was further subjected to re-compression conducted in a die at 4 tons/cm$^2$ of pressure for the purpose of further compacting and shaping of the member. Samples No. 1 to 5 of the alloy member in accordance with the invention were thus prepared. The zinc content of the Cu—Zn alloy was 20 wt % in each of the samples No. 1, 3, 5 and 6 and was 12.5 wt % in the sample No. 4. In the sample No. 2, the zinc content of the Cu—Zn—Sn alloy was 13% and the tin content was 10.7 wt %.

Comparative samples No. 9 and 10 were prepared by the same process as that described above, using different powder types of composition from the invention samples. Zinc content of the Cu—Zn alloy used in the samples No. 9 and 10 were 20 wt %.

The thus obtained materials will be referred to as "sintered solid" as indicated in Table 1.

EXAMPLE 2

Powder mixtures of the same compositions as those in Example 1 were uniformly placed by spraying on the surfaces of Cu-plated steel sheets, and were sintered for 10 to 30 minutes in a hydrogen atmosphere for 10 to 30 minutes at 800° C. to 900° C. of temperature. The thus obtained composite sintered members were worked by rolling so that the sintered layer of each member was compacted. Sequentially, a secondary sintering treatment were conducted to the members under the same conditions as the primary sintering mentioned above, whereby a sample No. 6 of the invention and a comparative sample No. 11 were prepared. Each of the thus obtained composite members was 2.2 mm in total thickness and the thickness of the sintered alloy layer was 0.6 mm. Members obtained through the described process will be referred to as "sintered bi-metal", as indicated in Table 1.

Thus, samples No. 1 to 6 were wear-resistant alloy sliding members as Examples of the present invention, while samples No. 7 to 11 are comparative members. Among these comparative members, samples No. 7 and 8 are conventional wear-resistant cast members which will be referred to as "cast solid" as in Table 1.

The members of samples No. 1 to 11 were machined to become specimens each having a thrust portion of 25 mm in outside diameter and 21.7 mm in inside diameter, and the specimens were subjected to a seizure test conducted by using Suzuki type testor. The testing conditions are shown in Table 2. The load was increased in a cumulative and stepped manner at a rate of 50 kgf/cm$^2$ at 30-minute interval up to 500 kgf/cm$^2$. The test result is shown in FIG. 1 in terms of the surface pressure at which seizure was observed. From FIG. 1, it is understood that the invention samples can endure higher surface pressure than the comparative samples without the risk of seizure.

Figure 2:
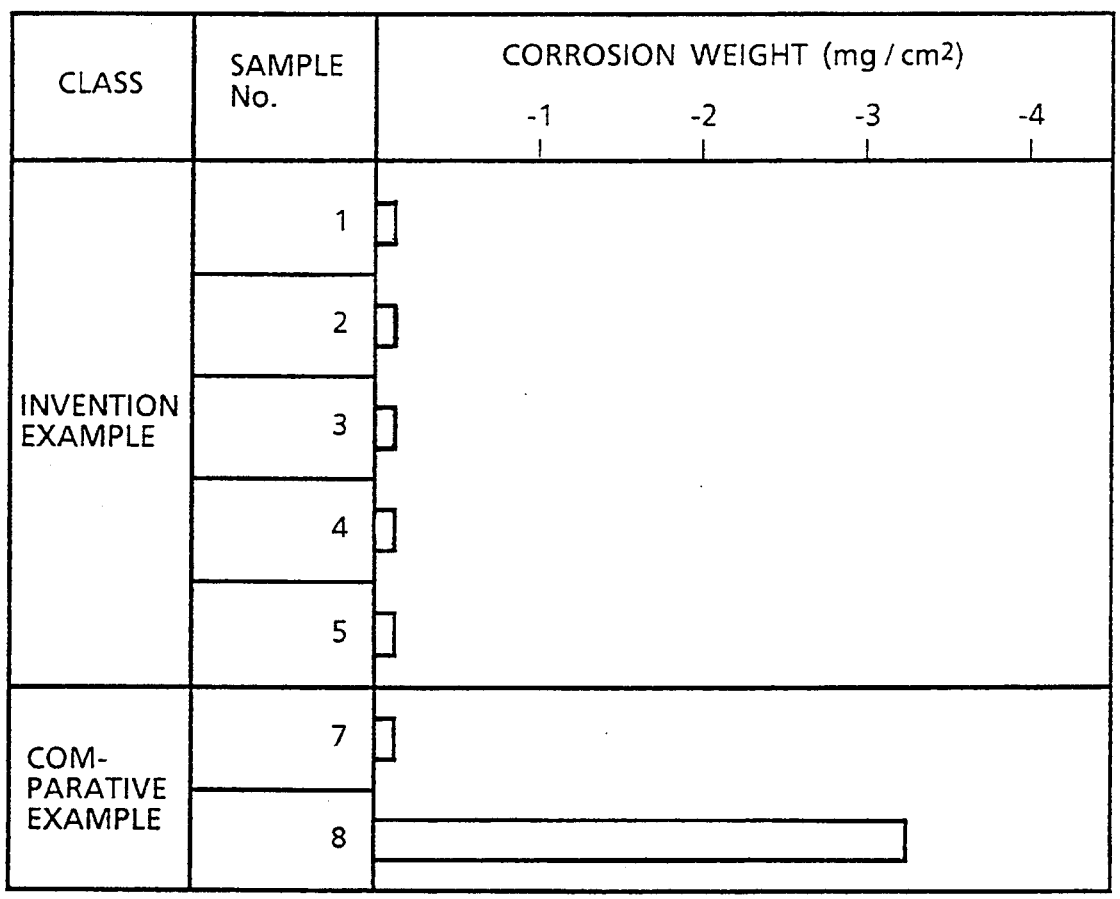
FIG. 2 is a graph illustrative of the results of a corrosion test.

A corrosion test was also conducted to the samples. The invention samples No. 1 to 5 and the comparative samples No. 7 and 8 were dipped for 1000 hours in SAE 15W-40 oil at 130° C., followed by weight measurement. The results are shown in FIG. 2. It will be understood that the invention samples generally exhibit excellent corrosion resistance as compared with the comparative sample No. 8 (lead bronze alloy). The invention samples are well compared with the comparative sample No. 7 (free cutting brass alloy) which inherently has superior corrosion resistance.

As will be understood from the above, the invention alloy exhibits high resistance both to seizure and corrosion, by virtue of dispersion of suitable amounts of lead and Ni—B compound in brass matrix. The alloy is expected to find spreading use as a sliding material which are required to be used under severe conditions of elevated speed and operation temperature, typically as a material of a floating bearing of a turbocharger, and a thrust bearing.

TABLE 1

| TYPE | SAMPLE NO. | FORM | POWDERS* | CHEMICAL COMPOSITIONS (wt %) | | | | | | HARDNESS (Hv5) |
|---|---|---|---|---|---|---|---|---|---|---|
| | | | | Cu | Zn | Pb | Ni | B | Sn | |
| INVENTION | 1 | SINTERED SOLID | (Cu—Zn) + Pb + (Ni—B) | Bal. | 16.9 | 10 | 5 | 0.5 | — | 78 |
| EXAMPLE | 2 | SAME AS ABOVE | (Cu—Zn—Sn) + Pb + (Ni—B) | Bal. | 11 | 10 | 5 | 0.5 | 9 | 90 |
| | 3 | SAME AS ABOVE | (Cu—Zn) + Pb + (Ni—B) | Bal. | 16 | 10 | 9 | 0.9 | — | 85 |
| | 4 | SAME AS ABOVE | SAME AS ABOVE | Bal. | 11 | 10 | 2 | 0.2 | — | 63 |
| | 5 | SAME AS ABOVE | SAME AS ABOVE | Bal. | 15.1 | 19 | 5 | 0.5 | — | 72 |

TABLE 1-continued

| TYPE | SAMPLE NO. | FORM | POWDERS* | CHEMICAL COMPOSITIONS (wt %) | | | | | | HARDNESS (Hv5) |
|---|---|---|---|---|---|---|---|---|---|---|
| | | | | Cu | Zn | Pb | Ni | B | Sn | |
| | 6 | SINTERED BI-METAL | SAME AS ABOVE | Bal. | 16.9 | 10 | 5 | 0.5 | — | 80 |
| COMPARA- | 7 | CAST SOLID | — | 59 | Bal. | 3 | — | — | — | 128 |
| TIVE | 8 | SAME AS ABOVE | — | Bal. | — | 15 | — | — | 8 | 87 |
| EXAM- | 9 | SINTERED SOLID | (Cu—Zn) + Pb + Ni | Bal. | 17 | 10 | 5 | — | — | 68 |
| PLE | 10 | SAME AS ABOVE | (Cu—Zn) + Pb | Bal. | 18 | 10 | — | — | — | 65 |
| | 11 | SINTERED BI-METAL | (Cu—Pb—Sn) | Bal. | — | 10 | — | — | 10 | 80 |

*Alloy powders are shown in parentheses.

TABLE 2

| ITEMS | SEIZURE TEST CONDITION |
|---|---|
| TESTING INSTRUMENT | SUZUKI-TYPE TESTER |
| BEARING SIZE | 25 × 21 mm (OUTSIDE DIA. × INSIDE DIA.) |
| SPEED | 1055 rpm |
| PERIPHERAL SPEED | 1.29 m/sec |
| LUBRICANT OIL | SAE30 |
| LUBRICATION METHOD | OIL BATH |
| LUBRICATION TEMP. | ROOM TEMP. |
| SHAFT MATERIAL | JIS S45C |
| SHAFT ROUGHNESS | Rmax 0.3 μm |
| SHAFT HARDNESS | Hv(10) 500 to 600 |

What is claimed is:

1. A wear-resistant sliding layer having superior anti-seizure and corrosion properties formed of a sintered alloy consisting essentially of 10 to 35 wt % of zinc, 10 to 20 wt % of lead, 1 to 10 wt % of nickel, 0.1 to 1 wt % of boron, and balance copper and unavoidable impurities.

2. A wear-resistant sliding layer according to claim 1, wherein the alloy further comprises 0.5 to 10 wt % of tin.

3. A wear-resistant sliding member comprising: a backing metal layer of a steel plate optionally having a surface plated with copper, and a sliding alloy layer of claim 1.

4. A wear-resistant sliding member comprising: a backing metal layer of a steel plate optionally having a surface plated with copper, and a sliding alloy layer of claim 2.

5. A sintered copper alloy of a sliding-contact material having superior properties of anti-seizure resistance, wear resistance and corrosion resistance consisting essentially of 10 to 35 wt % of zinc, 2 to 20 wt % of lead, 1 to 10 wt % Ni, 0.1 to 1 wt % B, with at least part of said Ni and B forming Ni—B compound, and balance of copper and unavoidable impurities.

6. A sintered copper alloy of a sliding-contact material according to claim 5, wherein the copper alloy further comprises 0.5 to 10 wt % of tin.

7. A sliding-contact member comprising:
a backing metal layer of a steel plate optionally having a surface plated with copper, and a sintered copper alloy layer of a sliding-contact material defined in claim 5.

8. A sliding-contact member comprising:
a backing metal layer of a steel plate optionally having a surface plated with copper, and a sintered copper alloy layer of a sliding-contact material defined in claim 6.

* * * * *